June 30, 1925.
R. R. WILLIAMS
1,543,890
METHOD OF AND APPARATUS FOR VULCANIZING RUBBER
Filed April 30, 1923
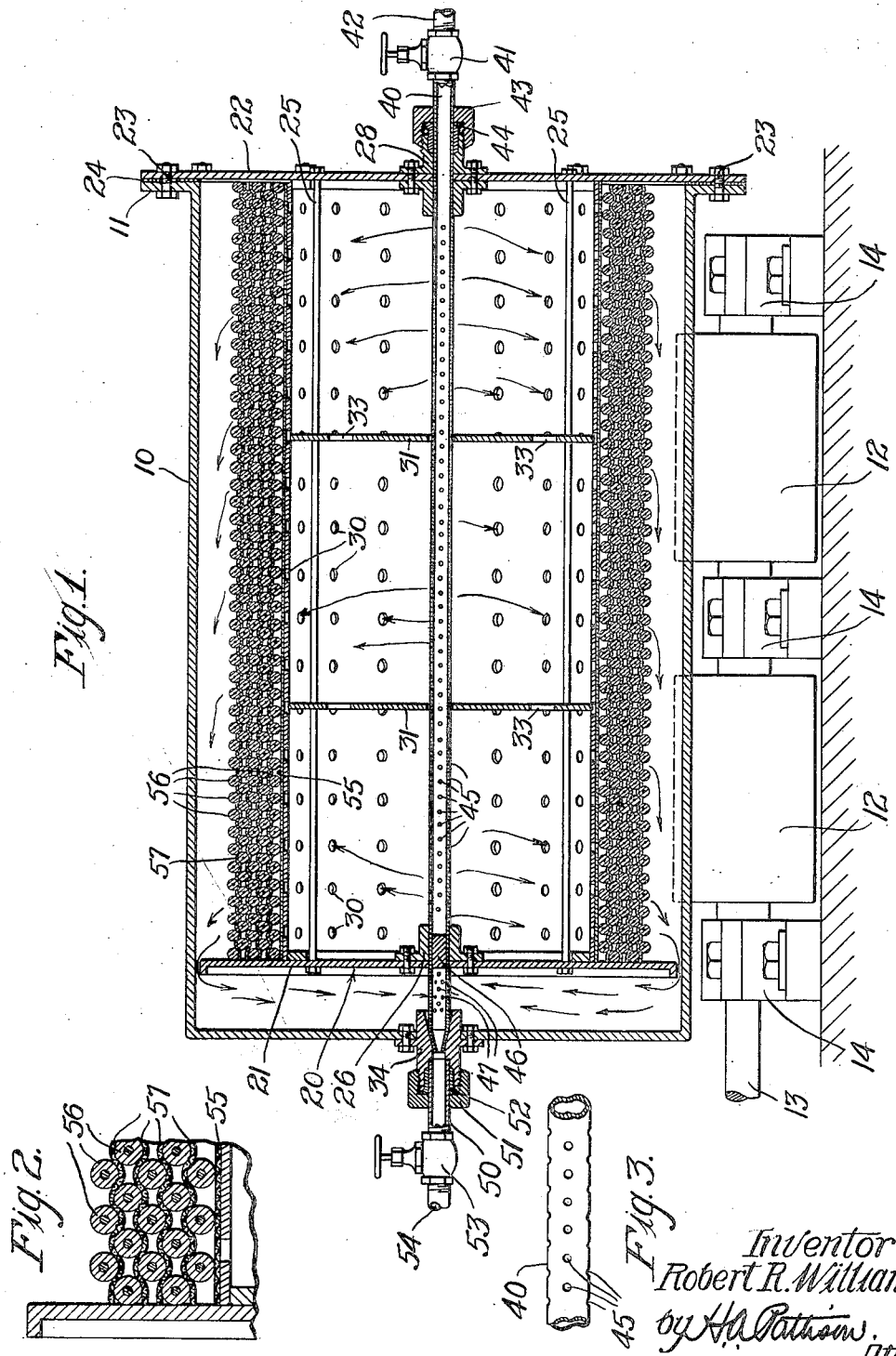
Inventor
Robert R. Williams
by H. A. Pattison
Atty.

Patented June 30, 1925.

1,543,890

UNITED STATES PATENT OFFICE.

ROBERT R. WILLIAMS, OF ROSELLE, NEW JERSEY, ASSIGNOR TO WESTERN ELECTRIC COMPANY, INCORPORATED, OF NEW YORK, N. Y., A CORPORATION OF NEW YORK.

METHOD OF AND APPARATUS FOR VULCANIZING RUBBER.

Application filed April 30, 1923. Serial No. 635,408.

*To all whom it may concern:*

Be it known that I, ROBERT R. WILLIAMS, a citizen of the United States, residing at Roselle, in the county of Union and State of New Jersey, have invented certain new and useful Improvements in Methods of and Apparatus for Vulcanizing Rubber, of which the following is a full, clear, concise, and exact description.

This invention relates to methods of and apparatus for vulcanizing rubber and similar materials, and more particularly to the vulcanization of materials of this nature in strand form or surrounding a core.

According to one method employed in the insulation of electrical conductors of considerable length a compound of rubber or other similar material is extruded over the conductor and the covered conductor is wound on a reel which is then placed in an oven and subjected to vulcanizing temperatures, in some instances in the presence of steam.

In order to insure uniform vulcanization of the insulating material throughout the length of the conductor it is desirable that all portions thereof be subjected simultaneously to the same temperatures. Since in some instances there are several layers of conductor on the reel, the outer layers tend to shield the intermediate layers nearer the periphery of the drum portion of the reel and thus delay the heating of the latter mentioned layers.

The effectiveness of the rubber or other material as an insulation being dependent to some extent upon the thickness of its wall it is desirable to prevent the decentralization of the core in the somewhat plastic material during the process of vulcanization.

An object of this invention is to insure uniform vulcanization of several layers of material.

Another object is to prevent decentralization of a core within a sheath during the vulcanization of the sheath.

A further object is to transmit the heating agent used in the vulcanization along predetermined paths between a plurality of articles being vulcanized.

In order to attain these objects in accordance with one embodiment of the invention, a core having a sheath of plastic material is wound upon the foraminous surface of a hollow drum of a reel in such a manner as to provide appreciable spaces between adjacent convolutions. The reel is then introduced into the vulcanizing oven, one head of the reel serving to hermetically seal the oven and to attach the reel thereto. Steam or some other suitable heating medium is then directed into the interior of the drum and is exhausted from the space within the oven externally of the reel, thus insuring that the heating medium circulate through the layers of sheathed cores on the reel. During the vulcanization period the oven and reel are revolved on the axis of the reel to overcome the tendency of the plastic sheath to become deformed which might result in the decentralization of the core therein.

It is believed that the invention will be clearly understood from the following description and the accompanying drawings showing a preferred type of apparatus by which the invention may be performed, and in which Fig. 1 shows a vertical cross-section of the vulcanizing oven containing the reel of material to be vulcanized;

Fig. 2 shows an enlarged sectional view of some of the sheathed cores, illustrating more clearly their spaced or separated formation; and Fig. 3 is an enlarged longitudinal view of a portion of the conduit employed for introducing steam or other heating medium into the oven.

As shown in the drawings, a cylindrical oven 10 having one end open with an outturned flange 11 is supported by a plurality of rollers 12 which may be driven from any suitable source of power (not shown) through a shaft 13 which is supported in bearings 14 mounted upon the floor. Although only one shaft and two rollers are shown, it is to be understood that another shaft similar to shaft 13 and parallel thereto will be provided which carries a similar number of rollers so that the oven rests between the two sets of rollers as in a cradle.

A reel, designated generally by the character 20, is provided with a closed head 21 of a diameter slightly less than the internal diameter of the oven 10. At the opposite end of the reel a closed head 22 is provided which has a diameter approximately that of the outwardly turned flange 11 of the oven. The head 22 is arranged so that it may be secured to the flange 11 by means of a plurality of bolts 23, or otherwise, a gasket 24 of any suitable compressible material being placed between the adjacent surfaces to hermetically seal the oven when the reel is attached thereto. The heads 21 and 22 of the reel 20 are suitably tied together by means of a plurality of tie rods 25 and each head is provided with a suitable internal hollow hub 26 which is attached thereto by bolts. The head 22 also carries an external hub flange 28 having a central opening in line with the openings of the associated hubs.

The outer periphery of the drum portion of the reel 20 is provided with a plurality of perforations 30 to make it foraminous. The wall of the drum is supported at suitable intervals by disc-like plates 31 suitably attached to the wall and provided with openings or perforations 33 therethrough. The left hand end of the oven 10 is provided with a centrally located socket 34 having an opening which gradually increases in diameter toward the interior of the oven, while it remains substantially at a constant diameter toward the outward end of the socket member. A conduit 40 extends through the end 22 and the left hand end of such conduit is tapered to permit the ready guiding of such conduit into the socket member 34. The right hand end of the conduit 40 is connected with a suitable hand valve 41 which controls the supply of steam or other suitable heating medium from a source (not shown) through an extension conduit 42. In order to properly seal the conduit 40 as it extends into the oven a cap 43 is provided which engages threads on the outward end of the member 28 and as it is screwed into place compresses a bushing member 44 to effectively prevent the escape of the medium which passes through the conduit 40. The conduit 40 is provided with a plurality of openings 45 of suitable size from a point within the oven to a point just within the oven near the flange member 26 attached to the head 21. These openings occur around the circumference so that the steam which is carried within the conduit 40 may escape in all directions within the reel 20. A plug of suitable material 46 is introduced into the conduit 40 at a point in line with the head 21 to prevent the continued flow of steam beyond such head. Another series of openings 47 similar to the openings 45 is provided in the portion of the conduit 40 extending from the outside of the head 21 to the socket member 34 for receiving steam. Connecting with the tapered end of the conduit 40 through the socket member 34 is an outlet conduit 50. A cap member 51 engaging the socket member 34 upon being screwed into place compresses a bushing member 52 to effectively seal the connection of the conduit 50 with the member 34. The conduit 50 is connected through a valve 53 and another conduit 54 with a suitable exhaust means (not shown), the valve 53 controlling the effectiveness of such means upon the conduit 50. Around the periphery of the drum a wrapping of cloth such as burlap or some other suitable porous or foraminous material 55 is provided upon which the sheathed core 56 may be wound in helices, the convolutions of which are separated somewhat to permit the ready flow therebetween of the steam or other heating medium employed. The adjacent layers of sheathed core may be separated by layers of cloth such as burlap or some other suitable foraminous material 57 which serves as a padding material to prevent deformation of the sheath as well as to provide spaces through which the steam may flow.

In the operation of the apparatus the reel 20 may receive the sheathed core as it emerges from the extruding machine, after which the reel is conveyed in any suitable manner to the oven and the head 21 inserted therein, the tapered end of the conduit 40 serving to properly guide the reel into place as shown. The head 22 is then securedly attached to the flange 11, thus sealing the oven, including the reel, with the exception of the conduit 40 and the outlet conduit 50. The valve 41 is then opened allowing steam to enter the oven through the conduits 42 and 40. The valve 53 is also opened, thereby connecting the exhaust means with the interior of the oven through the conduits 54, 50, and the left hand end of the conduit 40. The pressure of the steam flowing outwardly through the openings 45 in the conduit 40 allows a greater quantity of steam to circulate through the openings 30 and between the adjacent convolutions and layers of the sheathed core 56 so that all portions of such core and all layers thereof are subjected to the steam and are thereby heated to the required temperature in the shortest period of time. This process is further aided by the withdrawal through the conduit 50 of the wet steam from the outer layer of the sheathed core through spaces between the head 21 and the interior wall of the oven 10 through the perforations 47 in the left hand end of the conduit 40 and through the conduits 50 and 54. Thus a predetermined and definite route for the steam is established as indicated by arrows and since the differences in pressure of the steam inside and outside of the reel may be readily adjusted by means of the valves 41 and 53 this action may be accelerated or retarded as desired.

The shafts 13 are revolved, thereby causing the rollers 12 to revolve the oven 10 and the reel attached thereto, the conduits 40, 42, 50, and 54 remaining stationary. This rotation of the reel during the vulcanizing period prevents the sagging or deformation of the plastic sheath and further promotes the uniform heating of the sheath.

What is claimed is:

1. The method of vulcanizing an article, which comprises placing the article in an oven, introducing therein a heating medium for vulcanizing the article, and rotating the oven during vulcanization.

2. The method of vulcanizing a core sheathing, wrapped in a plurality of layers on a drum having a foraminous portion, which consists in placing the drum in an enclosure, introducing steam into the interior of the drum, withdrawing the steam from the external layer of the sheathing, and rotating the enclosure during the vulcanization.

3. In a vulcanizing apparatus, a hollow drum having a foraminous portion for receiving a strand of vulcanizable material, an open end receptacle for the drum, one head of the drum extending beyond the periphery of the receptacle and adapted to seal the receptacle when the drum is placed therein, and means extending through said head to convey steam to the interior of the drum.

4. In an apparatus for vulcanizing a sheathed core, a reel having a foraminous drum for receiving the sheathed core, an oven for enclosing the reel, means for directing steam into the oven, and means for rotating the oven.

5. In an apparatus for vulcanizing a sheathed core, a reel having a foraminous drum for receiving the sheathed core, an oven for enclosing the reel, means for attaching the reel to the oven, means for directing steam into the oven, and means for rotating the oven and the reel attached thereto.

6. In an apparatus for vulcanizing a sheathed core, an oven, a reel having a foraminous drum for receiving the sheathed core, one head of such reel being of a diameter smaller than the internal diameter of the oven, and the other head of the reel being of a diameter greater than the external diameter of the oven, means for attaching the latter mentioned head to the wall of the oven thereby sealing the oven, and means for introducing a vulcanizing heating agent into the oven.

7. In a vulcanizing apparatus, an oven, a rotatable support for material to be vulcanized, said support having a portion cooperating with the oven for sealing the oven when the support is placed therein, and means for introducing a medium for producing vulcanizing temperatures within the oven.

8. In an apparatus for vulcanizing strands of material, a reel having a foraminous drum for receiving the strand, a conduit extending through and rotatably supporting the reel and having a plurality of openings therein, means for admitting steam to the conduit whereby the steam flows through the openings in the conduit and the foraminous portion of the drum to the strand, and means for rotating the reel.

9. In a vulcanizing apparatus, a rotatable oven, a drum for receiving a strand of vulcanizable material positioned within said oven and rigidly secured thereto, and means for introducing a medium for producing vulcanizing temperatures within the oven.

10. In a vulcanizing apparatus, a rotatable oven, a reel for receiving the material to be vulcanized positioned within said oven and cooperating therewith to provide an air-tight chamber, and means for introducing a medium for producing vulcanizing temperatures within the oven.

11. In a vulcanizing apparatus, a rotatable oven, a foraminous reel for receiving the material to be vulcanized symmetrically positioned within said oven and rigidly secured thereto, the common axis of rotation for said oven and reel comprising a hollow conduit having a plurality of openings therethrough, means for admitting steam to the conduit whereby the steam flows through the openings in the conduit and the foraminous portion of the reel to the material to be vulcanized, and means for rotating the oven.

In witness whereof, I hereunto subscribe my name this 25 day of April A. D., 1923.

ROBERT R. WILLIAMS.